July 30, 1957
C. G. TUZICKA
2,800,719
CHALK LINE HOLDER FOR USE IN BRICK LAYING
Filed Dec. 3, 1954
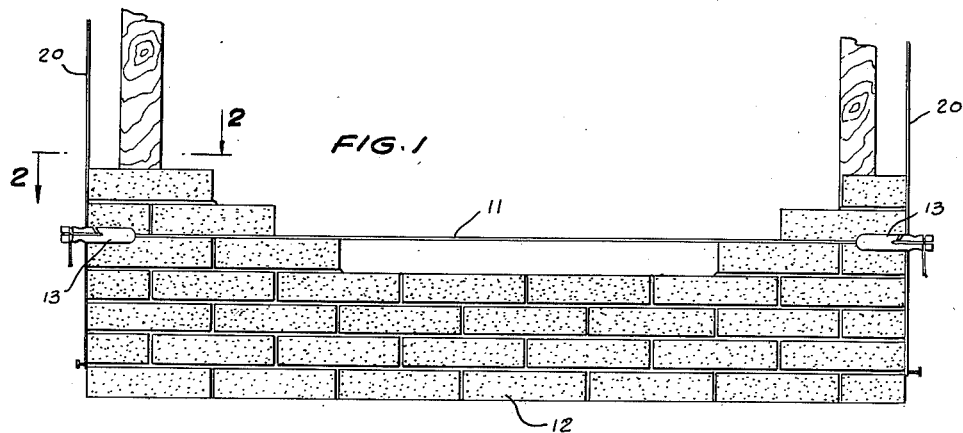
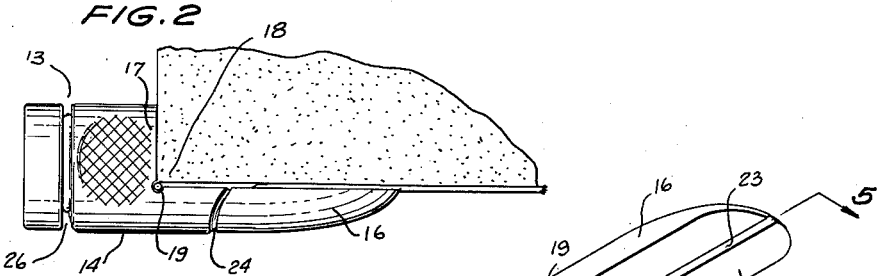
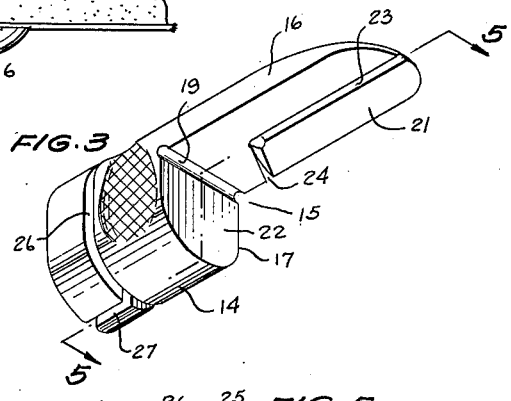
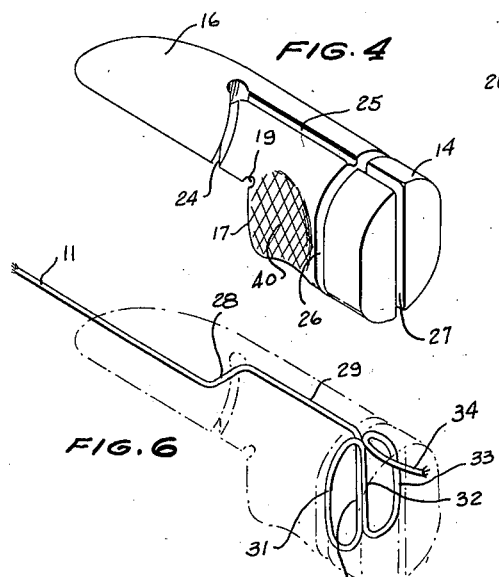
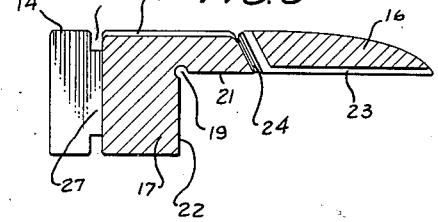
INVENTOR.
CHARLES G. TUZICKA
BY
McMorrow, Berman + Davidson
ATTORNEYS

# United States Patent Office 2,800,719
Patented July 30, 1957

2,800,719
CHALK LINE HOLDER FOR USE IN BRICK LAYING

Charles G. Tuzicka, Hoisington, Kans.

Application December 3, 1954, Serial No. 472,936

1 Claim. (Cl. 33—85)

This invention relates to improvements in masons' line holders, and more particularly to an improved chalk line holder of the type which is adapted to be held in place by the tension of a line connected thereto and disposed between the holder and a similar holder at the opposite end of the line, said line holders engaging opposite corner portions or opposite end portions of a masonry structure such as a wall or the like.

A main object of the invention is to provide a novel and improved mason's chalk line holder which is simple in construction, which is easy to use, and which holds a chalk line securely and does not readily become disengaged therefrom.

A further object of the invention is to provide an improved mason's chalk line holder which is inexpensive to manufacture, which is durable in construction, which is provided with improved anchoring means for the end of a chalk line secured thereto, securely holding the device in place and preventing the chalk line from falling, and being arranged so that the line is not cut or damaged by its engagement with the holder.

Further objects and advantages of the invention will become apparent from the following description and claim, and from the accompanying drawings, wherein:

Figure 1 is an elevational view of a portion of a brick wall adjacent to which a mason's line is supported by means of improved line holders constructed in accordance with the present invention.

Figure 2 is an enlarged horizontal cross sectional view taken on the line 2—2 of Figure 1.

Figure 3 is a perspective view of one of the line holders employed in Figure 1, showing the inside surfaces of the longitudinal and transverse arms of the line holder.

Figure 4 is a perspective view of the line holder of Figures 2 and 3 showing the configuration of the rear end of the line holder.

Figure 5 is a longitudinal vertical cross sectional view taken on the line 5—5 of Figure 3.

Figure 6 is a schematic view showing the manner in which the chalk line is fastened to the line holder of Figures 1 to 5, the line holder being shown in dotted view.

Referring to the drawings, 11 designates a chalk line which is supported parallel to and adjacent the surface of a masonry wall 12 by means of line holders 13, 13. Each line holder 13 comprises a body 14 formed with a right-angled notch 15 defining a longitudinal arm 16 and a transverse arm 17, said notch being adapted to engage with the corner 18 of a masonry wall structure, such as the masonry wall 12.

The corner of the notch 15 is formed with the generally cylindrical channel 19 providing clearance for a vertical plumb line 20 which may be thus positioned closely adjacent to the corner of the masonry structure 12 without interference with the line holder.

The inside surfaces of the longitudinal arm 16 and transverse arm 17, shown respectively at 21 and 22 are flat, as shown in Figure 3. The inside surface 21 of the longitudinal arm 16 is formed with a longitudinal groove 23 adapted to receive the chalk line 11, said longitudinal arm being formed with a laterally extending slot 24 opening at a side of the longitudinal arm adjacent the transverse arm 17 and communicating with the groove 23, as is shown in Figure 3.

The slot 24 is inclined laterally and rearwardly, as shown in Figures 2 and 4 and communicates at its upper end with a longitudinal groove 25 formed in the outer surface of the arm 16 and extending rearwardly into communication with a peripheral groove 26 formed on the rear portion of the body 14. Groove 26 and groove 25 also communicate with a transverse slot 27 formed in the rear end of the body 14, said transverse slot 27 being perpendicular to the planes of the flat inner surface 21 of arm 16 and the flat inner surface 22 of the arm 17, respectively.

In using the holders, each end of the chalk line 11 is anchored thereto by being engaged at 28 through the lateral slot 24, having a portion 29 thereof received in the longitudinal outer groove 25, having a portion thereof, shown at 30, engaged downwardly through the slot 27, having a further portion 31 thereof engaged in the peripheral groove 26 at one side thereof, having a still further portion thereof, shown at 32, engaged downwardly through the slot 27, having a further portion 33 thereof engaged in the portion of groove 26 opposite the cord portion 31, and having the end 34 thereof extending rearwardly through the upper portion of the slot 27, as shown in Figure 6. It will be understood that the line end portions are received in the respective longitudinal grooves 23 of the arms 16 of the holders 13, 13, whereby the line 11 is supported closely adjacent to the outside plane of the masonry wall 12 and whereby the line is held in position by the tension therein, said tension urging the holders 13, 13 against the corners of the wall to retain said holders in place by frictional engagement with said corners.

The side surfaces of the holders are knurled, as shown at 40, adjacent the notch 15, to facilitate gripping the line holders and to facilitate the manipulation of said holders by the persons using same.

While a specific embodiment of an improved mason's line holder has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A mason's line holder comprising a body formed with a right-angled notch at its forward portion defining a longitudinal arm and a transverse arm adapted to be engaged on the corner of a masonry structure, the body being of substantially uniform cross sectional area except for the portion thereof comprising the longitudinal arm, which is of susbtantially smaller cross sectional area than the remainder of the body, the inside surface of said arms being substantially flat, the inside surface of said longitudinal arm being formed with a longitudinal groove to receive a mason's line, said longitudinal arm being formed with a laterally and rearwardly inclined slot opening at a side of said longitudinal arm and communicating with said groove, the rear portion of said body being formed with a longitudinal slot opening at the rear end of the body and a peripheral outer groove communicating with said last-named slot, and the intermediate portion of the body being formed with a longitudinal outer groove connecting said laterally and rearwardly inclined slot with said longitudinal slot and said peripheral groove, said first-named longitudinal groove, said longitudinal slot and said second-named longitudinal groove being in the same longitudinal plane.

References Cited in the file of this patent

UNITED STATES PATENTS

| | | |
|---|---|---|
| 1,055,019 | Cammarata | Mar. 4, 1913 |
| 1,075,166 | Smyth | Oct. 7, 1913 |
| 1,594,836 | Ingram | Aug. 3, 1926 |
| 1,960,171 | Seeger | May 22, 1934 |
| 2,107,989 | Kuhn | Feb. 8, 1938 |